(12) United States Patent
Brundage et al.

(10) Patent No.: US 8,682,964 B1
(45) Date of Patent: Mar. 25, 2014

(54) PROGRESSIVELY LOADING NETWORK CONTENT

(75) Inventors: Michael L. Brundage, Kirkland, WA (US); Pongsakorn Teeraparpwong, Bellevue, WA (US); Sikandar Saifullah, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 413 days.

(21) Appl. No.: 13/047,369

(22) Filed: Mar. 14, 2011

(51) Int. Cl.
*G06F 15/16* (2006.01)

(52) U.S. Cl.
USPC ............................ 709/203; 709/217; 709/237

(58) Field of Classification Search
USPC ................... 709/203, 217–219, 237
See application file for complete search history.

(56) References Cited

U.S. PATENT DOCUMENTS

| | | | |
|---|---|---|---|
| 7,958,232 B1 * | 6/2011 | Colton et al. | 709/224 |
| 8,335,982 B1 * | 12/2012 | Colton et al. | 715/234 |
| 2005/0080880 A1 * | 4/2005 | von Tetzchner et al. | 709/219 |
| 2009/0106456 A1 * | 4/2009 | Muller et al. | 710/5 |

* cited by examiner

*Primary Examiner* — Patrice Winder
(74) *Attorney, Agent, or Firm* — Thomas | Horstemeyer, LLP (57) ABSTRACT

Disclosed are various embodiments for progressively loading content that is asynchronously obtained from a server. A network page is obtained in a client from a server. Supplemental data is obtained in the client from the server in response to an element of the network page. The supplemental data, which is obtained asynchronously with respect to the network page, includes content and scripted callbacks. Each scripted callback is processed in the client, and in response, a respective portion of the content that has been obtained from the server is also processed in the client.

25 Claims, 9 Drawing Sheets

PROGRESSIVELY LOADING NETWORK CONTENT

BACKGROUND

Ajax refers to a group of interrelated web development technologies that may be used to create interactive applications. In particular, the term "Ajax" may refer, for example, to the asynchronous use of JavaScript and extensible markup language (XML) on the client-side. Ajax may use, for example, a combination of cascading style sheets (CSS) and hypertext markup language (HTML) to format content. The document object model (DOM) corresponding to the content may be accessed with JavaScript in order to provide dynamic updates to the content. The dynamic updates may occur asynchronously with respect to the loading of the original content. The XMLHttpRequest (XHR) application programming interface (API) is one approach to exchanging data asynchronously between client and server while avoiding full-page reloads. The XHR API is supported to varying degrees by many browsers, including Microsoft® Internet Explorer, Mozilla® Firefox®, and Apple® Safari®, among others.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to the loading and rendering of network content in a progressive manner, even where such content is obtained asynchronously with respect to a network page. Network pages without Ajax content may be rendered progressively, such that when a portion of content is obtained from a server, the portion is processed (or "flushed"), and the rendered network page is updated accordingly. Network pages that contain Ajax content may use the XMLHttpRequest (XHR) object and application programming interface (API) for the client to request data asynchronously. Some browsers (e.g., Mozilla® Firefox®, Apple® Safari®, Google® Chrome®, etc.) support flushing in the XHR object, such that a callback is performed upon receipt of a partial payload of data from the server. However, other browsers (e.g., Microsoft® Internet Explorer, etc.) do not support this flushing behavior in the XHR object. In such browsers, Ajax content may only be rendered after it is received in its entirety.

Various embodiments of the present disclosure introduce an alternative approach to asynchronous communication between a client and a server such that Ajax content may be loaded progressively, even in browsers that do not support flushing in the XHR object. To this end, a hypertext markup language (HTML) element in the base network page may be utilized for a browser to obtain supplemental data from the server. The supplemental data includes one or more content segments, each followed by a scripted callback. The scripted callback triggers processing of the completed content segments in the browser. The rendered network page may be updated in response to each of the completed content segments. In the following discussion, a general description of the system and its components is provided, followed by a discussion of the operation of the same.

Figure 1:
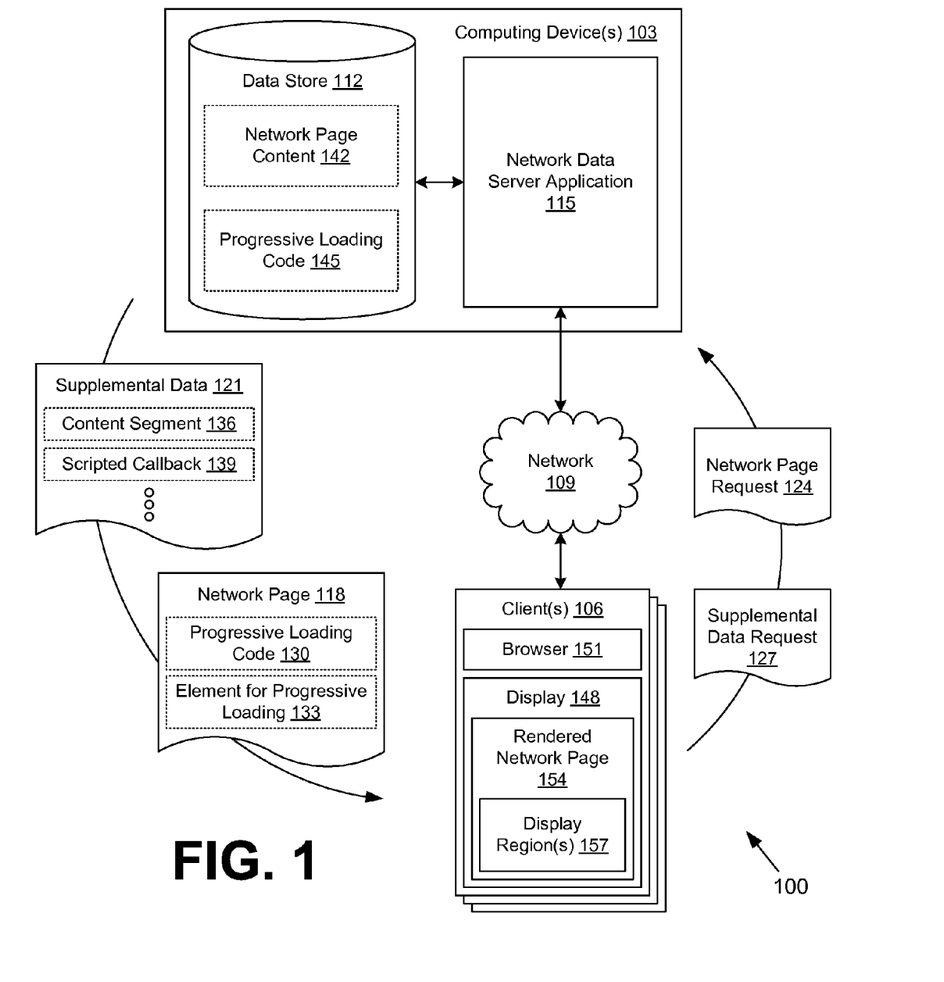
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a network data server application 115 and other applications, services, processes, systems, engines, or functionality not discussed in detail herein. The network data server application 115 is executed to serve up network content, such as network pages 118, supplemental data 121, and/or other forms of network content, in response to a request, such as a network page request 124, a supplemental data request 127, and/or other requests. The network data server application 115 may be configured to generate such network pages 118 and supplemental data 121 from data and code stored in the data store 112 or elsewhere. To this end, the network data server application 115 may include various programs, modules, scripts, and/or other code that perform generation of network pages 118 and supplemental data 121. In various embodiments, the network data server application 115 may include a commercially available hypertext transfer protocol (HTTP) server such as, for example, Apache® HTTP Server, Apache® Tomcat®, Microsoft® Internet Information Services (IIS), and/or other servers.

Each network page 118 corresponds to one or more HTML files, one or more extensible markup language (XML) files, one or more extensible HTML (XHTML) files, and/or other network page data. In some examples, a network page 118 may constitute a web page or a web application screen. The network page 118 may include progressive loading code 130, one or more elements for progressive loading 133, and/or other data. The progressive loading code 130 corresponds to JavaScript® or other code that configures asynchronous, yet progressive, loading of the supplemental data 121 through the use of the element for progressive loading 133. The element for progressive loading 133 may correspond to an HTML element such as an iframe element, a script element, or another element. The element for progressive loading 133 may be embedded in the network page 118 or may be added dynamically to the document object model (DOM) associated with the network page 118 by the progressive loading code 130.

The supplemental data 121 may include a plurality of content segments 136, where each of the content segments 136 is followed by a scripted callback 139 that triggers processing of the content segment 136 when the content segment 136 has been obtained. Each content segment 136 may correspond to HTML data, XML data, XHTML data, JavaScript data, and/or other data that may be used to update content of the network page 118. The type of data included in the content segment 136 may depend on the element for progressive loading 133. Where the data included in the content segment 136 includes JavaScript data, the data may be expressed using JavaScript Object Notation (JSON) or another format. In various embodiments, the content segments 136 may be separated by a delimiter, such as, for example, a string of three ampersands (i.e., "&&&") or another string. The delimiter may be chosen, for example, so as to be invalid in HTML, XML, or other language employed in the content segment 136.

As an example, where the element for progressive loading 133 is a script tag, the content segment 136 may include JavaScript code. As another example, where the element for progressive loading 133 is an iframe, the content segment 136 may include HTML markup. Each scripted callback 139 corresponds to a script block that triggers processing of the respective content segment 136, which may involve, for example, updating a DOM of the network page 118 or performing other action(s).

The data stored in the data store 112 includes, for example, network page content 142, progressive loading code 145, and potentially other data. The network page content 142 includes various data that may be used in generating the network pages 118 and the supplemental data 121. To this end, the network page content 142 may include code, text, HTML, XML, XHTML, cascading style sheets (CSS), extensible style sheet language transformations (XSLT), images, audio, video, portable document format (PDF) data, and/or other data. The progressive loading code 145 corresponds to various code that configures the network page 118 to perform the progressive loading functionality described herein, or is used to generate the progressive loading code 130 that is sent within the network page 118. To this end, the progressive loading code 145 may include JavaScript code, VBScript code, Java® code, and/or other forms of client-side code. In some embodiments, the progressive loading code 145 may also configure the generation of the supplemental data 121 by the network data server application 115.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 148. The display 148 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 151 and/or other applications. The browser 151 may be executed in a client 106, for example, to access and render network pages, such as web pages, or other network content served up by the computing device 103 and/or other servers, thereby generating a rendered network page 154 on the display 148. The rendered network page 154 may include one or more display regions 157, where asynchronously obtained network content is to be progressively rendered. The client 106 may be configured to execute applications beyond browser 151 such as, for example, email applications, instant message applications, and/or other applications.

Next, a general description of the operation of the various components of the networked environment 100 is provided. To begin, the client 106 requests a network page 118 from the network data server application 115 by way of a network page request 124. The network data server application 115 generates the network page 118 in response to the network page request 124. The network page 118 may be generated based in part on network page content 142 and progressive loading code 145. The network page 118 may include progressive loading code 130 and one or more elements for progressive loading 133. The network page 118 is sent over the network 109 to the client 106.

In the client 106, the browser 151 obtains the network page 118 and begins rendering it as a rendered network page 154 on the display 148. The browser 151 may execute the progressive loading code 130, which may involve creating one or more elements for progressive loading 133. If the browser 151 supports flushing in the XHR API, an XHR object may be used instead for the loading of asynchronous content. Otherwise, the elements for progressive loading 133 may be created in the DOM of the network page 118. In one embodiment, an element for progressive loading 133 corresponds to a hidden iframe element in the DOM.

The element for progressive loading 133 is used to generate a supplemental data request 127 that is sent to the network data server application 115 or another server within the domain of the network data server application 115. In response, the network data server application 115 generates the supplemental data 121 from the network page content 142 and/or the progressive loading code 145. The supplemental data 121 includes one or more content segments 136 each followed by a scripted callback 139. The supplemental data 121 is sent to the browser 151 over an HTTP or other connection.

As the content segments 136 are received at the browser 151, the scripted callbacks 139 are executed, and the progressive loading code 130 in the browser 151 begins processing the flushed content segments 136. Updates may be made dynamically to the DOM of the network page 118 as the content segments 136 are received, which may be reflected in one or more display regions 157 of the rendered network page 154. Other content related to the flushed content segments 136 (e.g., images or other linked data) may continue to download and be flushed synchronously by the browser 151.

Figure 2:
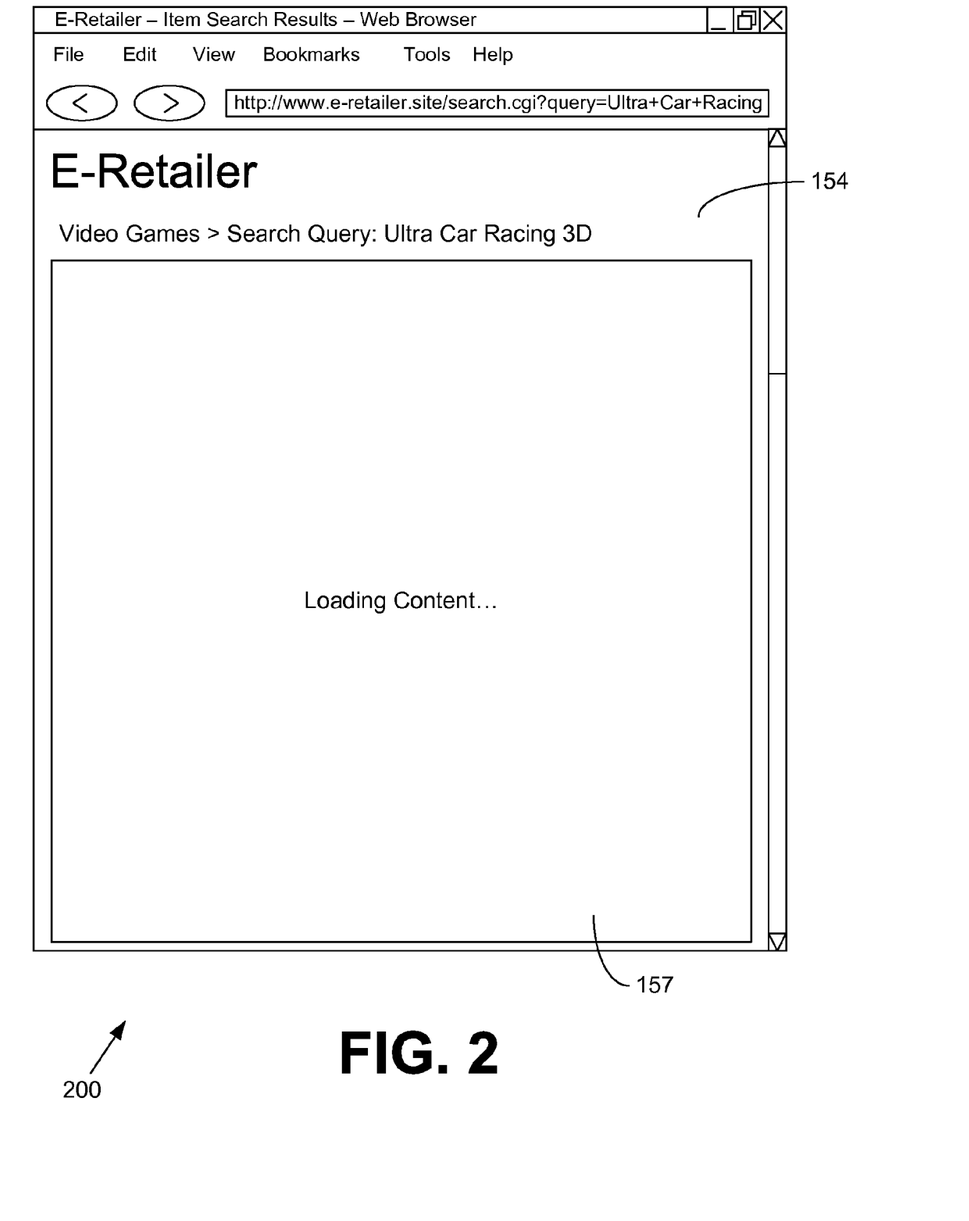
FIGS. 2-5 are drawings of examples of user interfaces rendered by a client in the networked environment of FIG. 1 according to various embodiments of the present disclosure.

Referring next to FIG. 2, shown is one example of a user interface 200 rendered by a browser 151 (FIG. 1) executed in a client 106 (FIG. 1) in the networked environment 100 (FIG. 1). The user interface 200 includes a rendered network page 154 and a display region 157. In this non-limiting example, the rendered network page 154 corresponds to a search result network page 118 (FIG. 1) that has been generated in response to a search query obtained by a user. The rendered network page 154 includes content such as a heading, a listing of the category and the search query, and the display region 157 in which the search results are to be displayed.

In this example, the display region 157 includes descriptive placeholder text ("Loading content . . . "). In other examples, other types of placeholders or no placeholder may be present. The search result content that is to be loaded into the display region 157 corresponds to Ajax content that is to be loaded asynchronously with respect to the network page 118.

Figure 3:
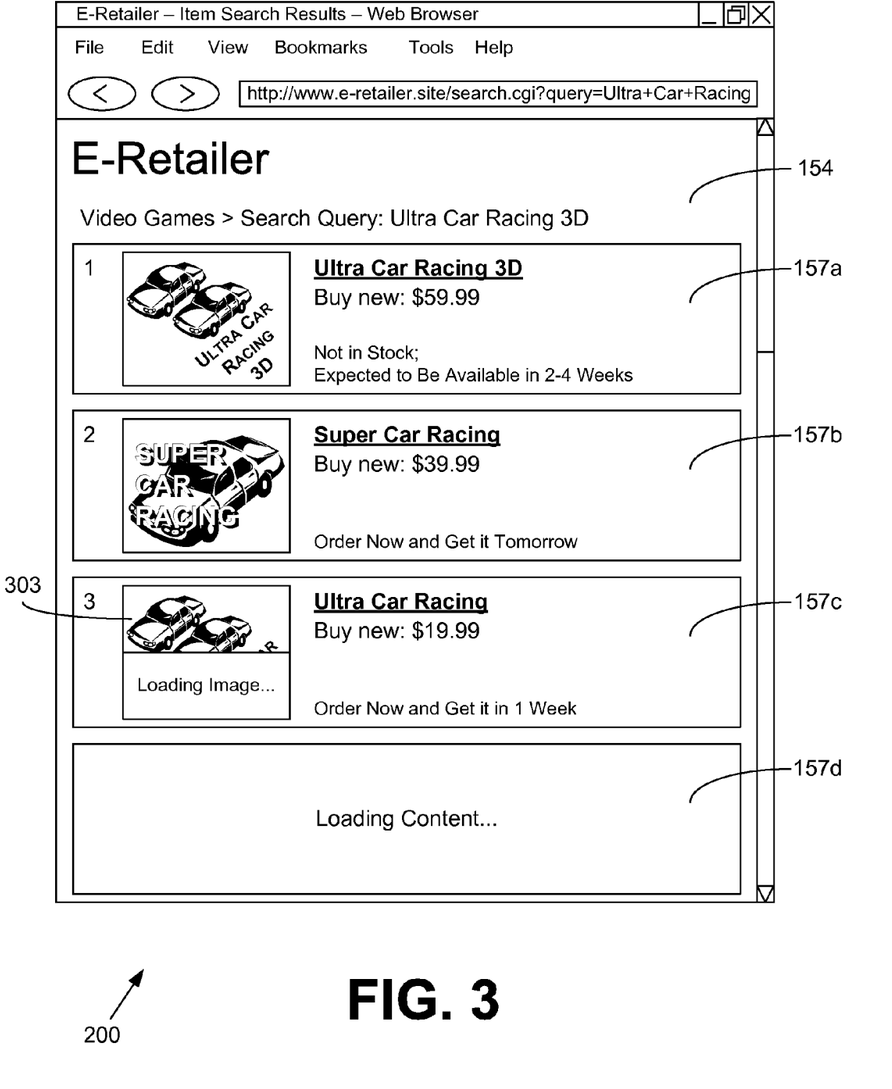

Moving on to FIG. 3, shown is another example of the user interface 200 rendered by a browser 151 (FIG. 1) executed in a client 106 (FIG. 1) in the networked environment 100 (FIG. 1). The user interface 200 in this example shows the rendered network page 154 of FIG. 2 being updated to include a partial listing of the search results. To this end, the display region 157 of FIG. 2 has been partially loaded from a portion of the Ajax content. The DOM of the network page 118 (FIG. 1) has been updated to include four display regions 157a, 157b, 157c, and 157d for the search results. The display regions 157a and 157b, corresponding to the first two of the search results, have been loaded and rendered completely.

The display region 157c, corresponding to the third search result, is in the process of being rendered, with the item image 303 being partially rendered. The display region 157d, corresponding to the subsequent search results, has yet to be rendered and, as depicted, corresponds to a descriptive placeholder text ("Loading content . . . "). In other examples, other types of placeholders or no placeholder may be present. It is noted that the browser 151 has flushed the content segments 136 (FIG. 1) of the supplemental data 121 (FIG. 1) that correspond to the display regions 157a, 157b, and 157c, but the last content segment 136 that is seen in the viewport of the browser 151 has yet to complete loading.

Figure 4:
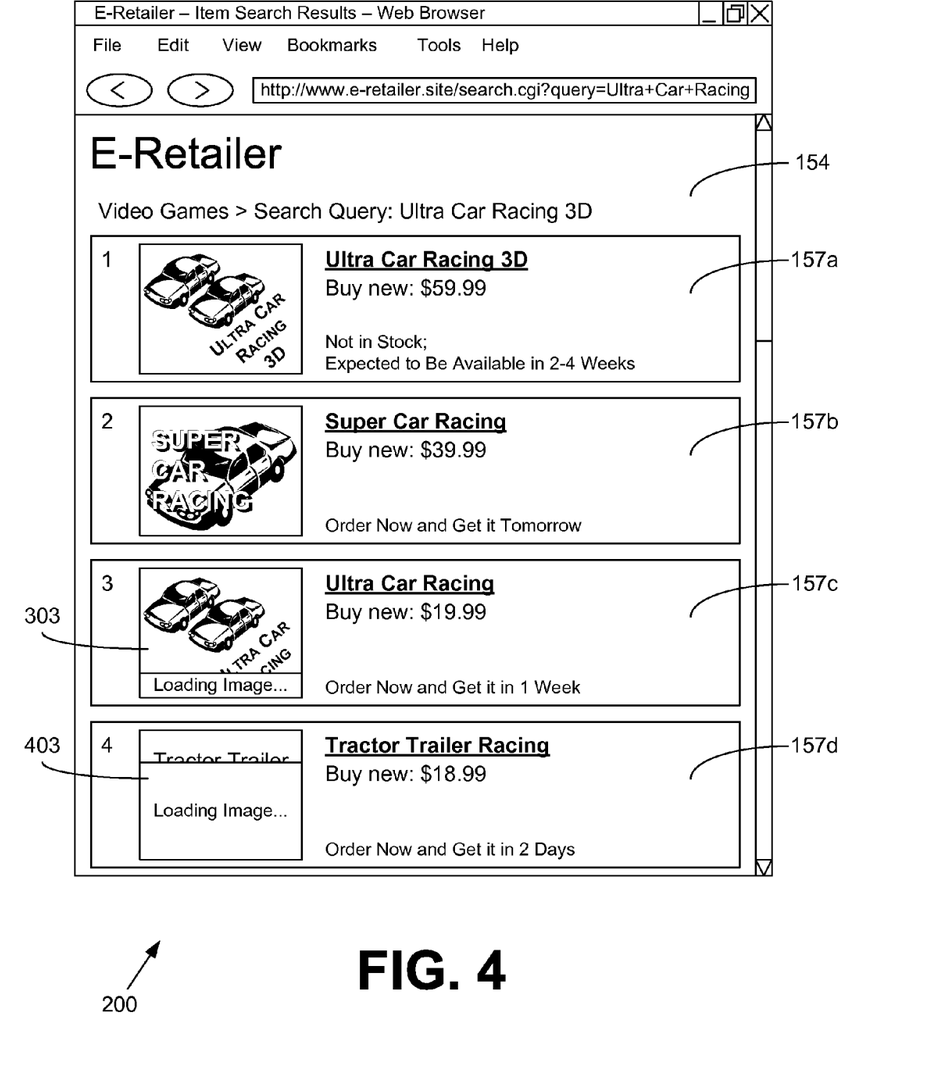

Turning now to FIG. 4, shown is another example of the user interface 200 rendered by a browser 151 (FIG. 1) executed in a client 106 (FIG. 1) in the networked environment 100 (FIG. 1). The user interface 200 in this example shows the rendered network page 154 of FIG. 3 being updated as more supplemental data 121 (FIG. 1) has been obtained by the browser 151. The display regions 157a and 157b, corresponding to the first two of the search results, have been loaded and rendered completely. The display region 157c, corresponding to the third search result, is still in the process of being rendered, with the item image 303 being partially rendered. The display region 157d, corresponding to the fourth search result, is also in the process of being rendered, with the item image 403 being partially rendered. It is noted that the content segments 136 (FIG. 1) associated with the display regions 157c and 157d have been obtained to the extent necessary to be flushed, although rendering of content in the display regions 157c and 157d has not fully completed.

Figure 5:
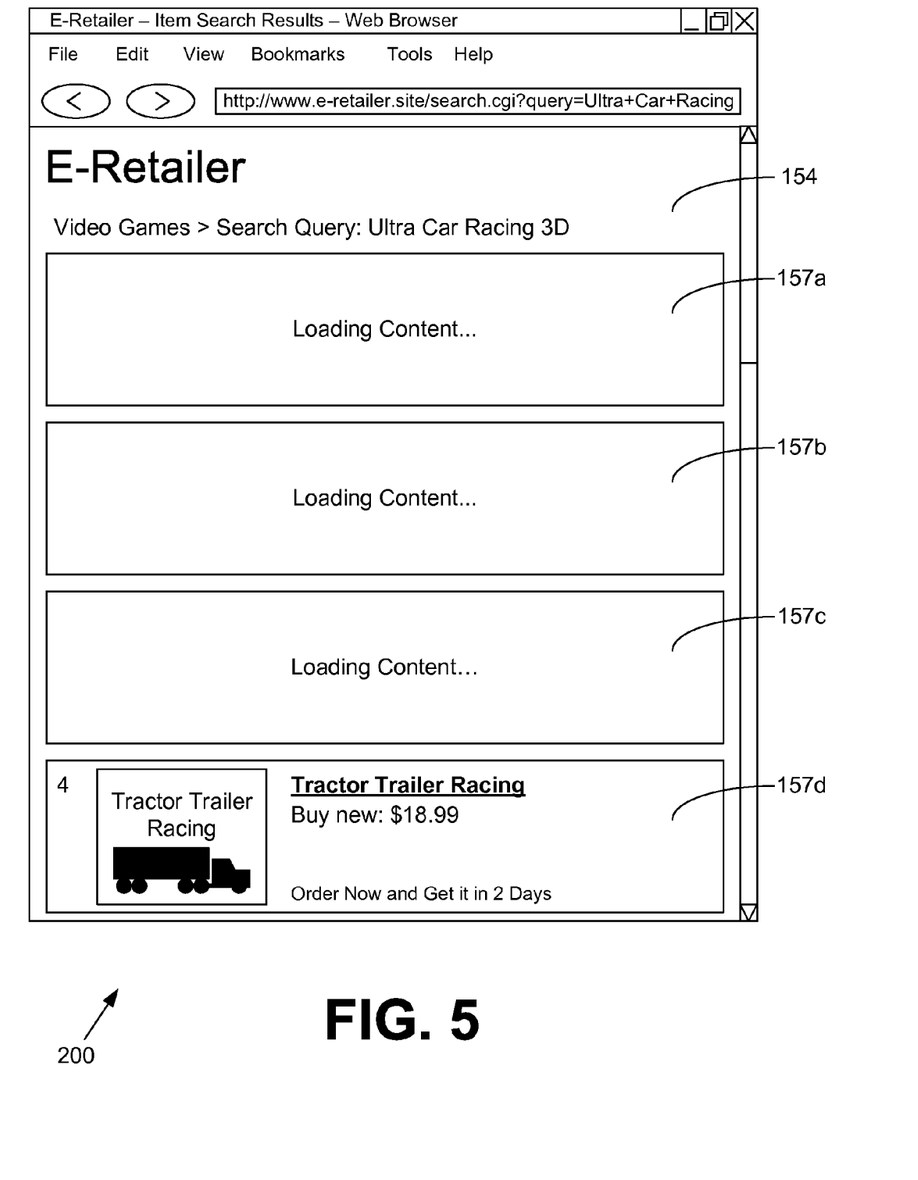

Continuing on to FIG. 5, shown is another example of the user interface 200 rendered by a browser 151 (FIG. 1) executed in a client 106 (FIG. 1) in the networked environment 100 (FIG. 1). In this example, the rendered network page 154 also includes four display regions 157a, 157b, 157c, and 157d above the fold. However, unlike in previous examples, rendering of the display region 157d corresponding to the fourth search result has completed before the rendering of the display regions 157a, 157b, and 157c corresponding to the first three search results. FIG. 5 illustrates that content segments 136 (FIG. 1) of the supplemental data 121 (FIG. 1) may be obtained in differing orders in some embodiments. Thus, the progressive loading of Ajax content may be programmatically controlled and does not have to occur in a top to bottom manner.

Figure 6A:
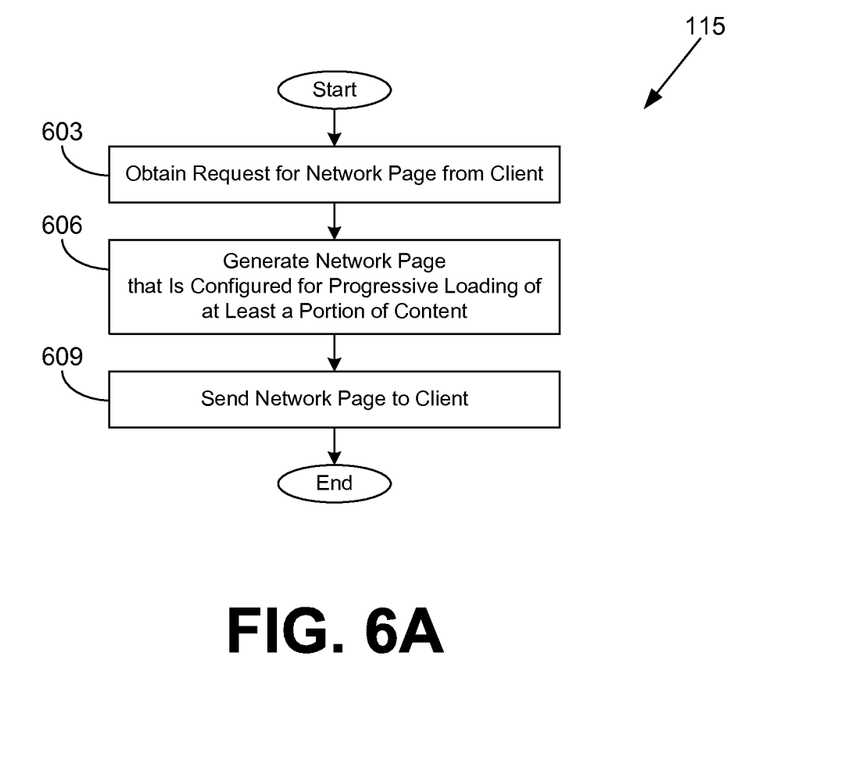
FIGS. 6A and 6B are flowcharts illustrating examples of functionality implemented as portions of a network data server application executed in a computing device in the networked environment of FIG. 1 according to various embodiments of the present disclosure.

Referring next to FIG. 6A, shown is a flowchart that provides one example of the operation of a portion of the network data server application 115 according to various embodiments. It is understood that the flowchart of FIG. 6A provides merely an example of the many different types of functional arrangements that may be employed to implement the operation of the portion of the network data server application 115 as described herein. As an alternative, the flowchart of FIG. 6A may be viewed as depicting an example method implemented in the computing device 103 (FIG. 1) according to one or more embodiments.

Beginning with box 603, the network data server application 115 obtains a network page request 124 (FIG. 1) from a client 106 (FIG. 1). In box 606, the network data server application 115 generates the network page 118 (FIG. 1) from the network page content 142 (FIG. 1) in response to the network page request 124. The network page 118 may include other network page content 142 that is to be loaded synchronously, such as CSS, images, audio, video, etc. The network page 118 is configured for progressive loading of at least a portion of the network page content 142 that is to be obtained asynchronously with respect to the network page 118. The network data server application 115 may process the progressive loading code 145 (FIG. 1) to obtain progressive loading code 130 (FIG. 1), an element for progressive loading 133 (FIG. 1), and/or other data to be included in the network page 118. In box 609, the network data server application 115 sends the network page 118 to the client 106. Thereafter, the portion of the network data server application 115 ends.

Figure 6B:
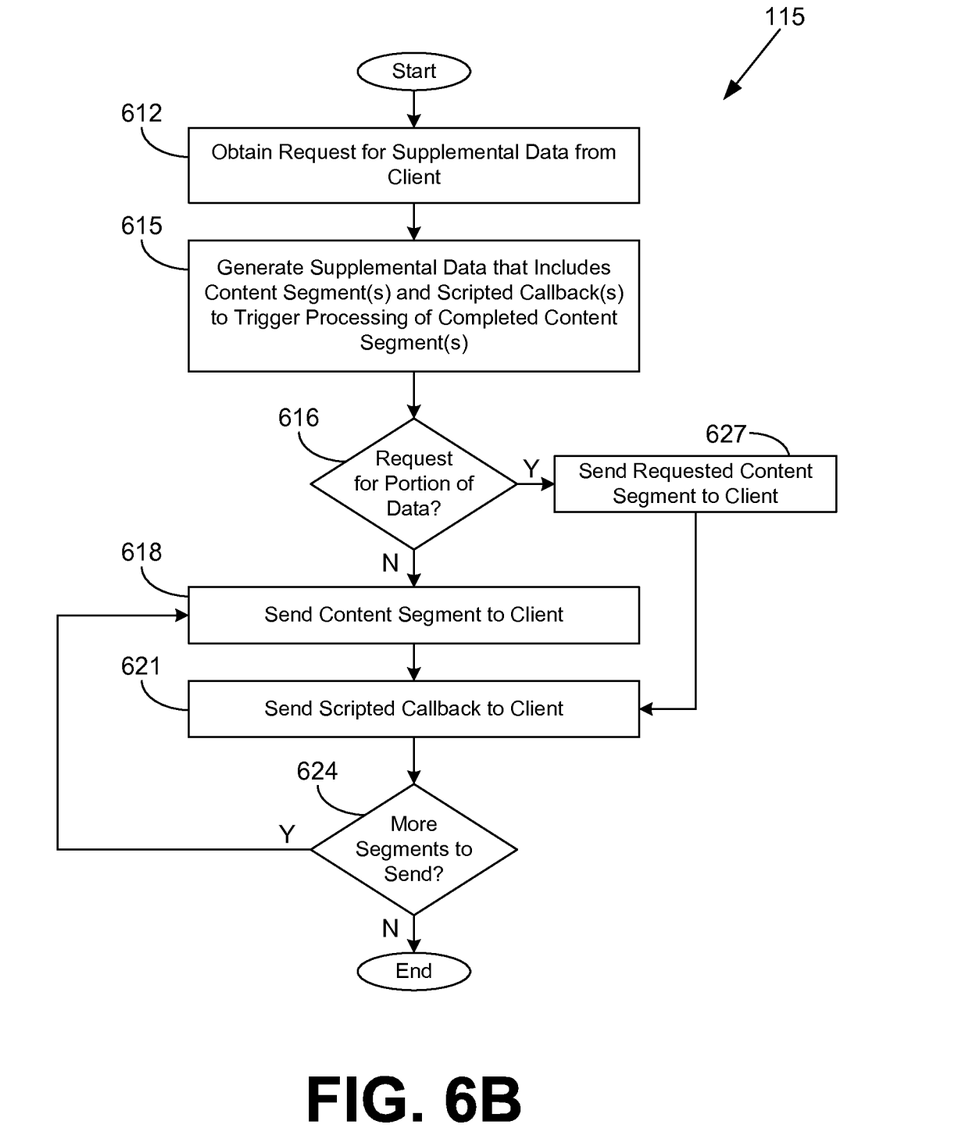

Continuing on to FIG. 6B, shown is a flowchart that provides one example of the operation of another portion of the network data server application 115 according to various embodiments. It is understood that the flowchart of FIG. 6B provides merely an example of the many different types of functional arrangements that may be employed to implement the operation of the portion of the network data server application 115 as described herein. As an alternative, the flowchart of FIG. 6B may be viewed as depicting an example method implemented in the computing device 103 (FIG. 1) according to one or more embodiments.

Beginning with box 612, the network data server application 115 obtains a supplemental data request 127 (FIG. 1) from the client 106 (FIG. 1). It is noted that the supplemental data request 127 may be received some time after the network page request 124 (FIG. 1) discussed in connection with the flowchart of FIG. 6A because the supplemental data request 127 is generated asynchronously with respect to the network page request 124. The supplemental data request 127 may be received before the network data server application 115 has completed sending the network page 118 (FIG. 1) in box 609 (FIG. 6A). Further, the supplemental data request 127 may be handed by an instance of the network data server application 115 that is different from the instance of the network data server application 115 that handles the network page request 124 in FIG. 6A. The supplemental data request 127 may be generated by the element for progressive loading 133 (FIG.

1), the progressive loading code 130 (FIG. 1), an XHR object, or other code related to the network page 118 and executed in the browser 151 (FIG. 1).

In box 615, the network data server application 115 generates supplemental data 121 (FIG. 1). The supplemental data 121 may include one or more content segments 136 (FIG. 1) and one or more scripted callbacks 139 (FIG. 1) that are configured to trigger processing of completed content segments 136 that have been obtained in the client 106. In another example, where the browser 151 supports flushing for the XHR object, the supplemental data 121 may merely include content, which may not explicitly be divided into content segments 136 and may not include the scripted callbacks 139.

In box 616, the network data server application 115 determines whether the supplemental data request 127 specifies a portion of the supplemental data 121. In other words, the supplemental data request 127 may include data that identifies a content segment 136 other than the initial content segment 136 of the supplemental data 121. Such a supplemental data request 127 may be employed to reduce the amount of supplemental data 121 to be transmitted over the network 109 after a timeout when a portion has already received and flushed at the client 106. When the supplemental data request 127 does not specify a portion of the supplemental data 121, the network data server application 115 continues to box 618.

In box 618, the network data server application 115 sends a content segment 136 to the client 106. In box 621, the network data server application 115 sends a scripted callback 139 to the client 106. In box 624, the network data server application 115 determines whether more content segments 136 remain to be sent. If a content segment 136 remains to be sent, the network data server application 115 returns to box 618 and sends the next content segment 136 of the supplemental data 121 to the client 106. If no content segments 136 remain to be sent, the portion of the network data server application 115 ends.

If the network data server application 115 determines in box 616 that the supplemental data request 127 does specify a portion of the supplemental data 121, the network data server application 115 moves instead to box 627. In box 627, the network data server application 115 sends the requested content segment 136 to the client 106. The network data server application 115 then continues to box 621 and sends a scripted callback 139 to the client 106. In box 624, the network data server application 115 determines whether more content segments 136 remain to be sent. If a content segment 136 remains to be sent, the network data server application 115 returns to box 618 and sends the next content segment 136 to the client 106. If no content segments 136 remain to be sent, the portion of the network data server application 115 ends.

Figure 7:
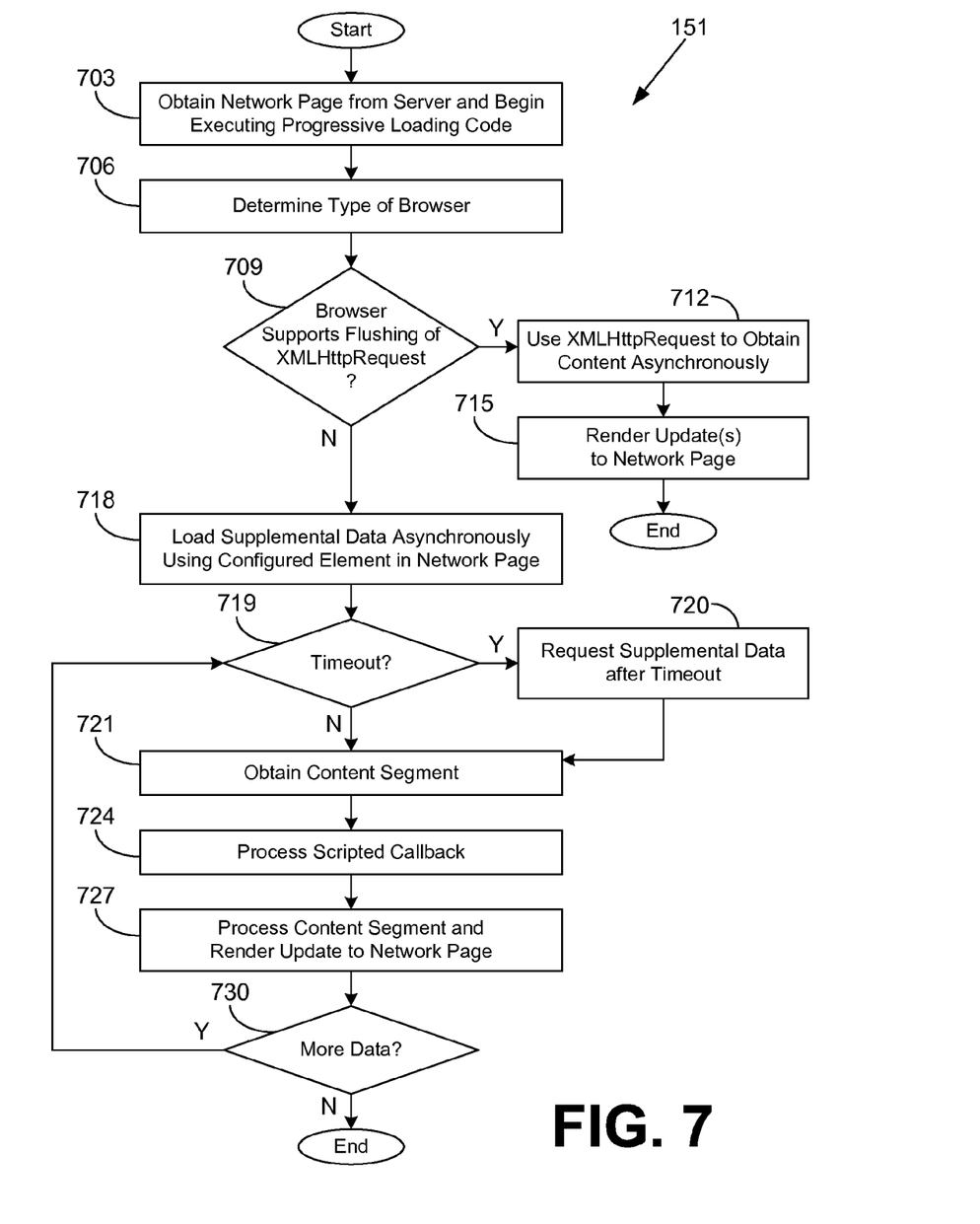
FIG. 7 is a flowchart illustrating one example of functionality implemented as portions of a browser executed in a client in the networked environment of FIG. 1 according to various embodiments of the present disclosure.

Turning now to FIG. 7, shown is a flowchart that provides one example of the operation of a portion of the browser 151 according to various embodiments. It is understood that the flowchart of FIG. 7 provides merely an example of the many different types of functional arrangements that may be employed to implement the operation of the portion of the browser 151 as described herein. As an alternative, the flowchart of FIG. 7 may be viewed as depicting an example of steps of a method implemented in the client 106 (FIG. 1) according to one or more embodiments.

Beginning with box 703, the browser 151 sends a network page request 124 (FIG. 1) to the network data server application 115 (FIG. 1) and obtains a network page 118 (FIG. 1). The network page 118 may include Ajax content, and if so, may include progressive loading code 130 (FIG. 1) and one or more elements for progressive loading 133 (FIG. 1). The browser 151 may begin executing the progressive loading code 130. In box 706, the progressive loading code 130 in the browser 151 determines the type of browser 151 that is being used. In other embodiments, the network data server application 115 may know the type of browser 151 through the user-agent field in an HTTP request and configure the progressive loading code 130 appropriately. In still other embodiments, the XHR API may not be used (e.g., for performance reasons, to simplify code development, etc.), thereby making browser 151 identification unnecessary for purposes of progressive loading.

In box 709, the progressive loading code 130 in the browser 151 determines whether the browser 151 supports flushing in the XHR API. In another embodiment, such a determination may be made by the network data server application 115. If the browser 151 supports flushing in the XHR API, the browser 151 continues to box 712 and uses the XHR API to obtain content for the network page 118 asynchronously with respect to the network page 118. In box 715, the progressive loading code 130 in the browser 151 renders one or more updates to the rendered network page 154 (FIG. 1). Such an update may involve rendering content in one or more display regions 157 (FIG. 1) configured to contain Ajax content. The progressive loading code 130 in the browser 151 may modify the DOM of the network page 118 (FIG. 1) to include updates based at least in part on the Ajax content. Thereafter, the portion of the browser 151 ends.

If the browser 151 does not support flushing in the XHR API, the progressive loading code 130 in the browser 151 continues to box 718. In box 718, the progressive loading code 130 in the browser 151 loads supplemental data 121 (FIG. 1) asynchronously using the configured element for progressive loading 133 (FIG. 1) in the network page 118. The element for progressive loading 133 may be an original element of the DOM in the network page 118 or may be generated by the progressive loading code 130. In various embodiments, the element for progressive loading 133 may correspond to an iframe, a script tag, or another HTML element. The element for progressive loading 133 is configured with a uniform resource identifier (URI) that is used in generating a supplemental data request 127 (FIG. 1).

In box 719, the progressive loading code 130 in the browser 151 determines whether a timeout has occurred involving the supplemental data 121. If a timeout has occurred, the progressive loading code 130 in the browser 151 may move to box 720 and request the supplemental data 121 again following the timeout. The new supplemental data request 127 may specify the content segment(s) 136 (FIG. 1) that are to be obtained, which content segment(s) 136 have been obtained, or other data that enables the network data server application 115 to send a partial quantity of the supplemental data 121. The browser 151 then moves to box 721. If a timeout has not occurred, the browser 151 also moves to box 721.

In box 721, the browser 151 obtains a content segment 136 in the supplemental data 121. In box 724, the browser 151 processes a scripted callback 139 (FIG. 1) that follows the content segment 136 in the supplemental data 121. In box 727, the browser 151 processes the content segment 136 in response to the scripted callback 139 and renders an update to the rendered network page 154. The update may involve modifying the DOM that is associated with the network page 118. In one embodiment, the update may involve adding content to display regions 157 (FIG. 1) of the rendered network page 154 that are reserved for the Ajax content. In box 730, the browser 151 determines whether more supplemental data 121 is to be obtained through the element for progressive loading 133. If more data is to be obtained, the browser 151 returns to box 719 and determines whether a timeout has occurred. If more data is not to be obtained, the portion of the browser 151 ends.

In some embodiments, the browser 151 may request multiple content segments 136 in parallel. To this end, the tasks of boxes 721, 724, and 727 may be parallelized. Therefore, the browser 151 may be configured to obtain another content segment 136 in box 721 before a previous content segment 136 has been fully obtained and processed in boxes 721, 724, and 727. As a non-limiting example, content for an above-the-fold display region 157 and content for a below-the-fold display region 157 may be loaded in parallel.

Figure 8:
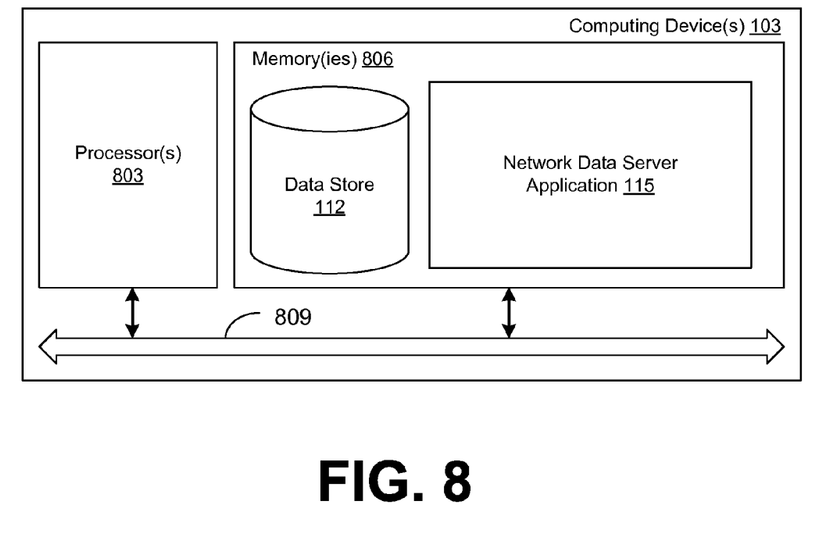
FIG. 8 is a schematic block diagram that provides one example illustration of a computing device employed in the networked environment of FIG. 1 according to various embodiments of the present disclosure.

With reference to FIG. 8, shown is a schematic block diagram of the computing device 103 according to an embodiment of the present disclosure. The computing device 103 includes at least one processor circuit, for example, having a processor 803 and a memory 806, both of which are coupled to a local interface 809. To this end, the computing device 103 may comprise, for example, at least one server computer or like device. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 are the network data server application 115 and potentially other applications. Also stored in the memory 806 may be a data store 112 and other data. In addition, an operating system may be stored in the memory 806 and executable by the processor 803.

It is understood that there may be other applications that are stored in the memory 806 and are executable by the processor 803 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 806 and are executable by the processor 803. In this respect, the term "executable" means a program file that is in a form that can ultimately be run by the processor 803. Examples of executable programs may be, for example, a compiled program that can be translated into machine code in a format that can be loaded into a random access portion of the memory 806 and run by the processor 803, source code that may be expressed in proper format such as object code that is capable of being loaded into a random access portion of the memory 806 and executed by the processor 803, or source code that may be interpreted by another executable program to generate instructions in a random access portion of the memory 806 to be executed by the processor 803, etc. An executable program may be stored in any portion or component of the memory 806 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 806 is defined herein as including both volatile and nonvolatile memory and data storage components. Volatile components are those that do not retain data values upon loss of power. Nonvolatile components are those that retain data upon a loss of power. Thus, the memory 806 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 803 may represent multiple processors 803 and the memory 806 may represent multiple memories 806 that operate in parallel processing circuits, respectively. In such a case, the local interface 809 may be an appropriate network 109 (FIG. 1) that facilitates communication between any two of the multiple processors 803, between any processor 803 and any of the memories 806, or between any two of the memories 806, etc. The local interface 809 may comprise additional systems designed to coordinate this communication, including, for example, performing load balancing. The processor 803 may be of electrical or of some other available construction.

Although the network data server application 115, the browser 151 (FIG. 1), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 6A, 6B, and 7 show the functionality and operation of an implementation of portions of the network data server application 115 and the browser 151. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 803 in a computer system or other system. The machine code may be converted from the source code, etc. If embodied in hardware, each block may represent a circuit or a number of interconnected circuits to implement the specified logical function(s).

Although the flowcharts of FIGS. 6A, 6B, and 7 show a specific order of execution, it is understood that the order of execution may differ from that which is depicted. For example, the order of execution of two or more blocks may be scrambled relative to the order shown. Also, two or more blocks shown in succession in FIGS. 6A, 6B, and 7 may be executed concurrently or with partial concurrence. Further, in some embodiments, one or more of the blocks shown in FIGS. 6A, 6B, and 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network data server application 115, the browser 151, and the progressive loading code 130, 145 (FIG. 1), that comprises software or code can be embodied in any non-transitory computer-readable medium for use by or in connection with an instruction execution system such as, for example, a processor 803 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in a computing device, the at least one program comprising:
code that generates a network page, the network page including at least one display region that is configured to be progressively rendered while supplemental content is obtained in a browser;
code that creates an element in a document object model (DOM) of the network page in the browser, wherein the element is configured to obtain supplemental data asynchronously with respect to the network page, the supplemental data including the supplemental content and a plurality of scripted callbacks;
code that processes the supplemental data in the browser while the supplemental data is being obtained, wherein individual ones of the plurality of scripted callbacks, when executed in the browser, are configured to cause a respective portion of the supplemental content to be processed by the browser;
code that initiates processing of the respective portion of the supplemental content in the browser before another portion of the supplemental content is fully obtained, wherein the DOM of the network page is updated in response to the respective portion of the supplemental content; and
code that renders the at least one display region in the network page in response to the DOM of the network page being updated.

2. The non-transitory computer-readable medium of claim 1, wherein the network page corresponds to a search result network page, the at least one display region corresponds to a listing of search results, and the supplemental content corresponds to a plurality of search results.

3. A system, comprising:
at least one computing device; and
a network data server application executable in the at least one computing device, the network data server application comprising:
logic that generates a network page, the network page including at least one element that is configured to obtain supplemental data in a client asynchronously with respect to the client obtaining the network page, the supplemental data including content and a plurality of scripted callbacks, wherein individual ones of the plurality of scripted callbacks, when executed in the client, are configured to cause the client to process a respective portion of the content that has been obtained by the client;
logic that sends the network page to the client in response to a first request; and
logic that sends the supplemental data to the client in response to a second request.

4. The system of claim 3, wherein the content is configured to be rendered in the network page.

5. The system of claim 3, wherein the content includes code that manipulates a document object model (DOM) of the network page.

6. The system of claim 3, wherein the network page further includes code that determines whether to obtain the content by way of the at least one element based at least in part on a type of browser executed in the client.

7. The system of claim 3, wherein the network page further includes code that obtains the content by way of an XMLHttpRequest object instead of the at least one element based at least in part on a type of browser executed in the client.

8. The system of claim 3, wherein the content is divided into a plurality of segments, and individual ones of the plurality of segments are followed in the supplemental data by one of the plurality of scripted callbacks.

9. The system of claim 8, wherein individual ones of the plurality of segments are separated by a delimiter.

10. The system of claim 3, wherein at least one of the plurality of scripted callbacks is configured to cause the client to process the portion of the content before the client has completed obtaining another portion of the content.

11. The system of claim 3, wherein at least one of the plurality of scripted callbacks is configured to cause the client to process the portion of the content irrespective of whether the client has completed obtaining another portion of the content.

12. The system of claim 3, wherein the at least one element is a hypertext markup language (HTML) element.

13. The system of claim 12, wherein the HTML element is an iframe element.

14. The system of claim 12, wherein the HTML element is a script element.

15. The system of claim 3, wherein the supplemental data corresponds to a hypertext markup language (HTML) file.

16. The system of claim 3, wherein the supplemental data corresponds to a JavaScript file.

17. A method, comprising:
- obtaining, in a computing device, a network page from a server;
- obtaining, in the computing device, supplemental data from the server in response to an element of the network page, the supplemental data being obtained asynchronously with respect to the network page, the supplemental data including content and a plurality of scripted callbacks, wherein individual ones of the plurality of scripted callbacks, when executed in the computing device, are configured to cause the computing device to process a respective portion of the content that has been obtained from the server;
- processing, in the computing device, the individual ones of the plurality of scripted callbacks; and
- in response to processing the individual ones of the plurality of scripted callbacks, processing, in the computing device, the respective portion of the content that has been obtained from the server.

18. The method of claim 17, further comprising rendering, in the computing device, the respective portion of the content in a region of the network page.

19. The method of claim 17, further comprising:
- determining, in the computing device, a type of browser that is executing code in the network page; and
- obtaining, in the computing device, the content from the server using an XMLHttpRequest object instead of obtaining the supplemental data in response to the element when the type of browser supports flushing of data obtained by the XMLHttpRequest object.

20. The method of claim 17, further comprising:
- determining, in the computing device, whether the obtaining the supplemental data has been interrupted; and
- automatically retrying, in the computing device, the obtaining the supplemental data when the obtaining the supplemental data has been interrupted.

21. The method of claim 20, wherein automatically retrying the obtaining the supplemental data is further configured to request a portion of the supplemental data from the server that is less than an entirety of the supplemental data.

22. The method of claim 17, further comprising:
- updating, in the computing device, a document object model (DOM) of the network page according to the respective portion of the content in response to processing the respective portion of the content; and
- rendering, in the computing device, at least a portion of the network page for display in response to updating the DOM of the network page.

23. The method of claim 17, further comprising creating, in the computing device, the element in a document object model (DOM) of the network page in response to code in the network page.

24. The method of claim 17, wherein the element is a hypertext markup language (HTML) element selected from the group consisting of: an iframe element and a script element.

25. The method of claim 17, wherein individual ones of the plurality of scripted callbacks follows a respective segment of the content in the supplemental data.

* * * * *